United States Patent
Monga

(10) Patent No.: US 8,619,768 B2
(45) Date of Patent: Dec. 31, 2013

(54) METHOD FOR DYNAMIC SENSOR NETWORK PROCESSING

(75) Inventor: Indermohan Monga, Acton, MA (US)

(73) Assignee: Avaya, Inc., Basking Ridge, NJ (US)

( * ) Notice: Subject to any disclaimer, the term of this patent is extended or adjusted under 35 U.S.C. 154(b) by 211 days.

(21) Appl. No.: 12/067,975

(22) PCT Filed: Sep. 25, 2006

(86) PCT No.: PCT/US2006/037368
§ 371 (c)(1),
(2), (4) Date: Mar. 25, 2008

(87) PCT Pub. No.: WO2007/038462
PCT Pub. Date: Apr. 5, 2007

(65) Prior Publication Data
US 2008/0259919 A1    Oct. 23, 2008

Related U.S. Application Data

(60) Provisional application No. 60/720,837, filed on Sep. 27, 2005.

(51) Int. Cl.
*H04L 12/28* (2006.01)
*H04L 12/56* (2011.01)

(52) U.S. Cl.
USPC ........... 370/389; 370/250; 370/400; 370/408; 340/593; 340/619; 340/622

(58) Field of Classification Search
USPC ............ 370/250, 25, 400, 408, 389; 307/413; 340/593, 619, 622
See application file for complete search history.

(56) References Cited

U.S. PATENT DOCUMENTS

| | | | |
|---|---|---|---|
| 6,016,310 A * | 1/2000 | Muller et al. | 370/255 |
| 6,505,086 B1 * | 1/2003 | Dodd et al. | 700/65 |
| 6,629,133 B1 * | 9/2003 | Philyaw et al. | 709/217 |
| 6,650,779 B2 | 11/2003 | Vachtesvanos et al. | |
| 6,687,247 B1 * | 2/2004 | Wilford et al. | 370/392 |
| 6,801,528 B2 * | 10/2004 | Nassar | 370/389 |
| 7,116,643 B2 * | 10/2006 | Huang et al. | 370/255 |
| 7,181,192 B2 | 2/2007 | Panasik et al. | |

(Continued)

OTHER PUBLICATIONS

International Search Report for PCT/US06/37368 dated Sep. 25, 2006; 5 pages.

(Continued)

*Primary Examiner* — Benjamin H Elliott, IV
(74) *Attorney, Agent, or Firm* — Anderson Gorecki & Rouille LLP

(57) ABSTRACT

Described are a method and a sensor aware network for dynamic processing of sensor data. Network context data are inserted into data packets from sensors or local sensor networks coupled to the sensor aware network. Sensor aware nodes in the sensor aware network can read the context data and can respond by performing specific network actions. The sensor data and network context data are provided to one or more application nodes. The sensor data and network context data can be stored in a database and later searched according to the network context data. Advantageously, sensor data flows can be treated differently by the sensor aware network, the application and the user, depending on the type of sensor data and the actual data values. Thus critical responses to certain sensor data flows can be implemented more efficiently than otherwise possible using conventional network configurations.

17 Claims, 3 Drawing Sheets

(56) References Cited

U.S. PATENT DOCUMENTS

| | | | |
|---|---|---|---|
| 7,242,294 B2 * | 7/2007 | Warrior et al. | 340/539.22 |
| 7,340,770 B2 * | 3/2008 | Freund | 726/11 |
| 7,400,594 B2 * | 7/2008 | Pereira et al. | 370/310 |
| 7,590,098 B2 * | 9/2009 | Ganesh | 370/338 |
| 7,610,621 B2 * | 10/2009 | Turley et al. | 726/11 |
| 7,631,184 B2 * | 12/2009 | Ryan | 713/160 |
| 7,710,961 B2 * | 5/2010 | Miller et al. | 370/390 |
| 7,719,980 B2 * | 5/2010 | Lee et al. | 370/235 |
| 2003/0154339 A1 * | 8/2003 | Wu et al. | 710/305 |
| 2005/0249215 A1 * | 11/2005 | Kelsey et al. | 370/392 |
| 2006/0026678 A1 * | 2/2006 | Zakas | 726/22 |
| 2006/0149905 A1 * | 7/2006 | Park et al. | 711/141 |
| 2006/0161645 A1 | 7/2006 | Moriwaki et al. | |
| 2006/0167634 A1 | 7/2006 | Cho et al. | |
| 2006/0187866 A1 * | 8/2006 | Werb et al. | 370/311 |
| 2006/0224619 A1 * | 10/2006 | Kang et al. | 707/103 X |
| 2006/0280181 A1 * | 12/2006 | Brailas et al. | 370/392 |
| 2006/0282498 A1 * | 12/2006 | Muro | 709/203 |
| 2007/0019641 A1 * | 1/2007 | Pai et al. | 370/389 |
| 2007/0115116 A1 * | 5/2007 | Zabek | 340/539.22 |
| 2008/0259919 A1 * | 10/2008 | Monga | 370/389 |
| 2009/0222541 A1 * | 9/2009 | Monga et al. | 709/222 |

OTHER PUBLICATIONS

Sheth, E., et al., "Poster Abstract: SenSlide—A Sensor Network Based Landslide Prediction System", SenSys '05, Nov. 2-4, 2005, San Diego.

Krishnamachari, Bhaskar, et al., "The Impact of Data Aggregation in Wireless Sensor Networks", DEBS '02.

Vaidyanathan, Karthikeyan, et al., "Data Aggregation Techniques in Sensor Networks", Technical Report OSU-CISRC-11/04-TR60, Ohio State University, Columbus, Copyright, 2006.

"Nortel Application Brief: Dynamic Resource Allocation Controller (DRAC)", www.nortel.com, 2004.

* cited by examiner

METHOD FOR DYNAMIC SENSOR NETWORK PROCESSING

RELATED APPLICATION

This application claims the benefit of U.S. Provisional Application No. 60/720,837, filed Sep. 27, 2005, titled "Sensor Flow Tagging and Interpretation by Network Elements," the entirety of which provisional application is incorporated by reference herein.

FIELD OF THE INVENTION

The invention relates generally to network processing of sensor measurements. More particularly, the invention relates to a method of network processing based on the insertion of network context information into data packets comprising sensor measurement data and the interpretation of the network context information by sensor aware nodes.

BACKGROUND OF THE INVENTION

Advancements in computing technology have led to the production of sensors capable of observing and reporting various real-world phenomena in a time-sensitive manner. Additionally, the growth in distributed communication technology (e.g., the Internet) has led to the development of sensor networks. Sensor networks have been proposed for use in numerous applications, including military and civilian applications. Generally, sensors are adapted to detect or monitor certain events or conditions. Sensors may be simple, such as a device that monitors temperature, or more complex, such as a video camera. Data generated at the sensor is transmitted in data packets over a sensor network to one or more end-points. An end-point can include an application software instantiation that can react to the sensor data or can be a user interface that presents the sensor data in numerical or graphical form to a user. Network traffic comprising sensor data are referred to herein as a sensor data flow. As the number of sensors increases, the probability of congestion in the sensor data flow increases which can lead to sub-optimal routing performance. Data packets can be dropped and the overall response time of the application or the user can increase.

Data aggregation is a technique known in the art that attempts to alleviate localized congestion problems. Generally, data aggregation is used to determine what data are useful and then to transmit only the useful data to the end-point, thereby reducing congestion and other associated problems. Various aggregation techniques have been proposed in the art. Although current data aggregation techniques have resulted in reduced congestion in sensor data flows, there is still a need for improved control of sensor data flows. As an increasing number of sensors get deployed over increasingly wider geographies and are networked to sets of applications over different access and IP networks, localization aspects, Quality of Service ("QoS") aspects, and the relationship between the kind of event detected or condition monitored and an appropriate response to the event or condition become increasingly difficult to maintain.

SUMMARY

In one aspect, the invention features a sensor aware network. The sensor aware network includes a sensor aware node configured to receive sensor data and to generate a data packet for transmission over the sensor aware network. The data packet has a payload comprising network context data and the sensor data. The network context data is determined in response to at least one rule provided by an application. In one embodiment, the sensor aware network also includes a sensor aware node configured to receive the generated data packet and to perform a network action in response to the network context data.

In another aspect, the invention features a sensor aware network that includes a sensor, a first sensor aware node and a second sensor aware node. The sensor is adapted to generate sensor data in response to a sensor measurement. The first sensor aware node is configured to receive the sensor data and to generate a data packet having a data payload that includes network context data and the sensor data. The second sensor aware node is configured to receive the data packet from the first sensor aware node and to perform an action in response to the network context data. In one embodiment, the sensor aware network also includes a network command module to provide a policy to the first sensor network aware node. The policy has at least one rule used to determine the network context data.

In yet another aspect, the invention features a method of dynamic sensor network processing of a data packet. Sensor data is received at a sensor aware node. A data packet having a data payload that includes network context data and the sensor data is generated at the sensor aware node. The network context data is determined according to at least one rule. In one embodiment, the data packet is received at another sensor aware node and a network action is performed in response to the network context data.

BRIEF DESCRIPTION OF THE DRAWINGS

The above and further advantages of this invention may be better understood by referring to the following description in conjunction with the accompanying drawings, in which like numerals indicate like structural elements and features in the various figures. For clarity, not every element may be labeled in every figure. The drawings are not necessarily to scale, emphasis instead being placed upon illustrating the principles of the invention.

DETAILED DESCRIPTION

In brief overview, the invention relates to a sensor aware network in which network context data are inserted into data packets that include sensor data. Network context data as used herein means context data that can be interpreted by sensor aware nodes in the network as well as by applications executed at one or more application nodes in the network. Sensor aware nodes can read the context data and can respond by performing specific network actions including, for example, managing the sensor data flow through the network. The sensor data and network context data are provided to one or more application nodes. Sensor data and context data can be stored in a database and later searched according to various search parameters, including searches based on the network context data. Advantageously, the method of the invention permits sensor data flows to be treated differently by the sensor aware network, the application and the user, depending on the type of sensor data and the actual data values. Thus critical responses to certain sensor data flows can be implemented more efficiently than otherwise possible using conventional network configurations.

Figure 1:
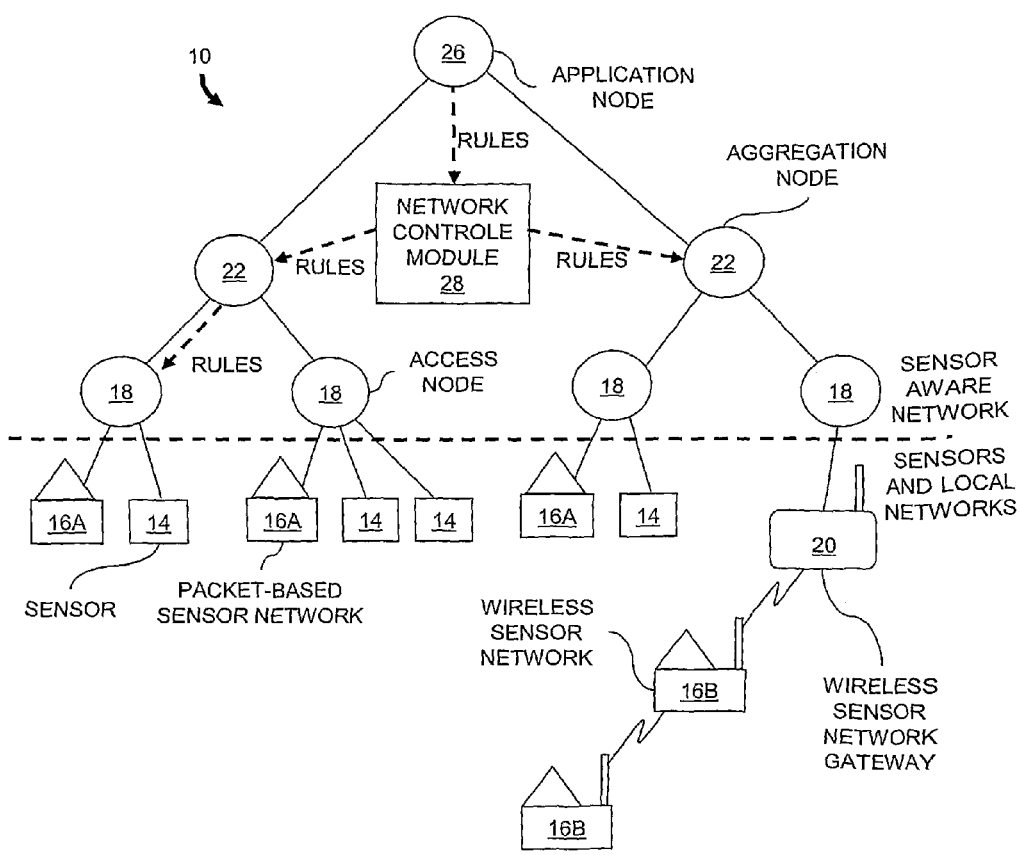
FIG. 1 is a functional block diagram of an embodiment of a sensor aware network in accordance with the invention.

Referring to FIG. 1, a sensor data network 10 includes a plurality of sensors 14. As used hereafter, the term "sensor" means a device or component that responds to a measurement variable and any associated electrical or optical components or circuitry used to convert the response to a digital signal such as a digital electrical signal or a digital optical signal. A wide variety of types of sensors 14 are contemplated, including, by way of example, pressure, temperature, optical, acoustic, chemical, biological, radiation, nuclear and video sensors. Each sensor 14 generates sensor data typically according to a time-based sampling of a measurement parameter. For example, a temperature sensor can provide data periodically to indicate the ambient temperature at the location of the sensor. Similarly, a video sensor generates image data at a sensor frame rate.

The network 10 also includes packet-based sensor networks 16A and wireless sensor networks 16B (generally 16). The sensors 14 and packet-based sensor networks 16A are coupled to a sensor aware network (indicated by the region above the horizontal dashed line in FIG. 1) at access nodes (or "edge nodes") 18. The wireless sensor networks 16B couple to the sensor aware network at an access node 18 through a wireless sensor network gateway 20. Sensors 14 and sensor networks 16 sharing a common access node need not provide the same type of sensor data. For instance, temperature sensors and pressure sensors can interface with the sensor aware network through the same access node 18.

The sensor aware network includes aggregation nodes 22 which aggregate sensor data from two or more access nodes 18. Although not shown in the illustrated embodiment, an aggregation node 22 can aggregate data received from other aggregation nodes 22. An application node 26 directly communicates with the aggregation nodes 22 and a network control module 28. The illustrated network 10 includes only one application node 26 although generally any number of application nodes 26 can be in communication with the aggregation nodes 22 and the network control module 28.

The application node 26 executes one or more applications. By way of example, applications include tracking, image recognition, analytics, public safety/surveillance and alarm notification applications. The application node 26 generates one or more rules (i.e., a policy) for sensor data and network situational context. The rules may be dynamic in that the application node 26 can modify, add or delete rules over time according to the specific application.

Figure 2:
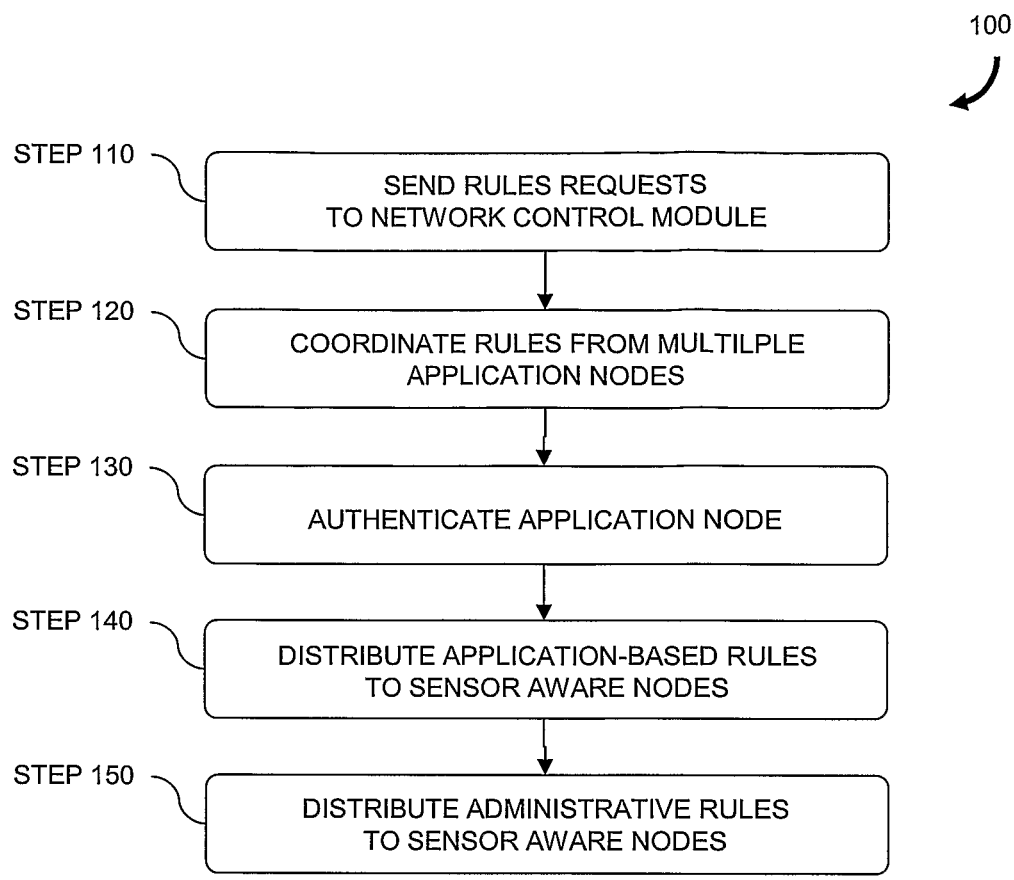
FIG. 2 is a flowchart representation of an embodiment of a method for provisioning rules to sensor aware nodes in a sensor aware network according to the invention.

FIG. 2 is a flowchart representation of an embodiment of a method 100 for provisioning rules to sensor aware nodes in a network according to the invention. Referring to FIG. 1 and FIG. 2, rules are sent (step 110) from the application node 26 to the network control module 28 which serves as a rules orchestrator, or arbitrator. The network control module 28 may optionally include a dynamic network resource allocation controller to control various network resources (e.g., bandwidth) which, in one embodiment, are controlled in response to network context data. The network control module 28 coordinates (step 120) rules which may be received from multiple application nodes 26 to ensure no rules conflicts occur. The network control module 28 also performs (step 130) application node authentication. More specifically, a rule from an application node 26 cannot be provided to a sensor aware node without access approval. Thus access to sensor data is limited only to authorized application nodes 26. Rules from approved application nodes 26 are sent (step 140) from the network control module 28 through the sensor aware network to sensor aware nodes (all the way to access nodes 18). Steps 110 to 140 are repeated in a dynamic manner as the rules from the application node 26 change in time.

Administrative rules can be established and distributed (step 150) by the network control module 28 to the sensor aware nodes. Administrative rules are generally application-independent. For example, the network control module 28 can set administrative rules to require that all network context data inserted into data packets include a node timestamp and node IP address, regardless of which application nodes 26 are to receive the sensor data packets.

Rules are used to define network situational contexts for which various types of tags are added to data packets at access nodes 18 as described below with respect to FIG. 3. In one example, the application node 26 sends rules to the network control module 28 which then provides the rules to identified access nodes 18 located in a certain geographical region. One rule might be a request that sensor data from a certain type of sensor 14 received at access nodes 18 in the identified region be associated (i.e., "tagged") with network context data indicating that the network 10 should treat the sensor data in a specific manner (e.g., treat as priority data) if the sensor data satisfy predetermined criteria. In a more specific example, the rule can be a request that sensor data from temperature sensors in the region be "tagged" as priority if the data indicate that the temperature exceeds an acceptable temperature value. In another example, the rules can include an identification of specific destination nodes to receive prioritized sensor data.

Rules are not limited to sensor data provided from a single access node 18. In one embodiment, sensor data received at an aggregation node 22 from one access node 18 can trigger a network context data change to sensor data received from another access node 18 linked to the aggregation node 22. For example, if a fire is sensed according to sensor data received at one access node 18, data from video sensors received at another access node 18 can be tagged as high priority.

Advantageously, the intentions of the application node 26 are implemented in a distributed manner as the sensor data enters the sensor aware network and are routed through the sensor aware network. Rules applied at sensor aware nodes can assist in sensor data traffic management and indicate how the sensor data are to be interpreted. In contrast, conventional sensor data networks simply forward all sensor data to the application nodes which perform all the sensor data processing.

Figure 3:
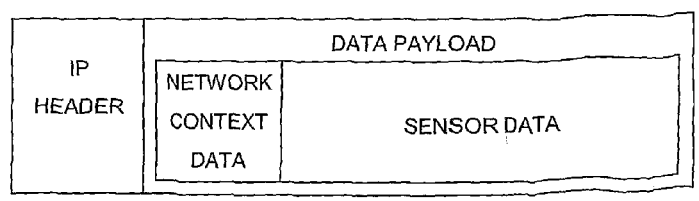
FIG. 3 is a block diagram representation of a data packet that includes sensor data and network context data in accordance with an embodiment of the invention.

FIG. 3 depicts a data packet 30 configured at one of the access nodes 18 in the sensor aware network in accordance with an embodiment of the invention. Prior to configuration of the illustrated data packet 30, sensor data are received at the access node 18. The sensor data can be received, for example, in a data packet having a proprietary format or in an IP data packet. The data packet 30 has a data payload that includes data from one or more sensors 14. The data packet 30 also includes an Internet Protocol (IP) header. The data payload portion of the data packet 30 includes the sensor data preceded by network context data. In one embodiment, the network context data are inserted into the data payload as a text string such as an XML description or the like. In effect, the network context data are treated within the data packet 30 as a data header or metadata. In other embodiments, the network context data are inserted into the payload in other locations such as by concatenation at the end of the sensor data.

The IP header contains information such as the data packet source and destination. Generally, the sensor aware network routes the data packet 30 to the destination node according to the IP header. Network nodes having only routing and transport capabilities do not see the network context data and therefore forward the data packet 30 according to the IP header information. Sensor aware nodes, such as aggregation nodes 22 having sensor awareness capability, examine the data payload to determine whether network context data are present. If no network context data are present, the data packet 30 is routed according to standard routing processes based on the information in the IP header. However, if network context data are present in the data payload, the sensor aware node can act on, i.e., respond to, the network context data according to one or more rules. For example, the network action can be to change the routing information for the data packet 30. The IP header can be modified to indicate the desired destinations according to the applicable rule and the data packet 30 is forwarded accordingly. In another example, the network context data can indicate that the associated sensor data should be treated as high priority data and the sensor aware node responds by changing the type of service rate in the IP header to correspond to high priority. In another example, the packet can be duplicated and sent to multiple applications or multicast and sent as data over a dynamic multimedia connection to a mobile user. Preferably, the network context data includes an indication that the priority has changed so that later analysis of the sensor data will show that the sensor data was actually process as priority data by the sensor aware network. Although routing and traffic management can be affected by the network context data, it should be noted that none of the actions implemented by the sensor aware nodes in response to network context data result in any change to the sensor data contained in the data packet 30.

Figure 4:
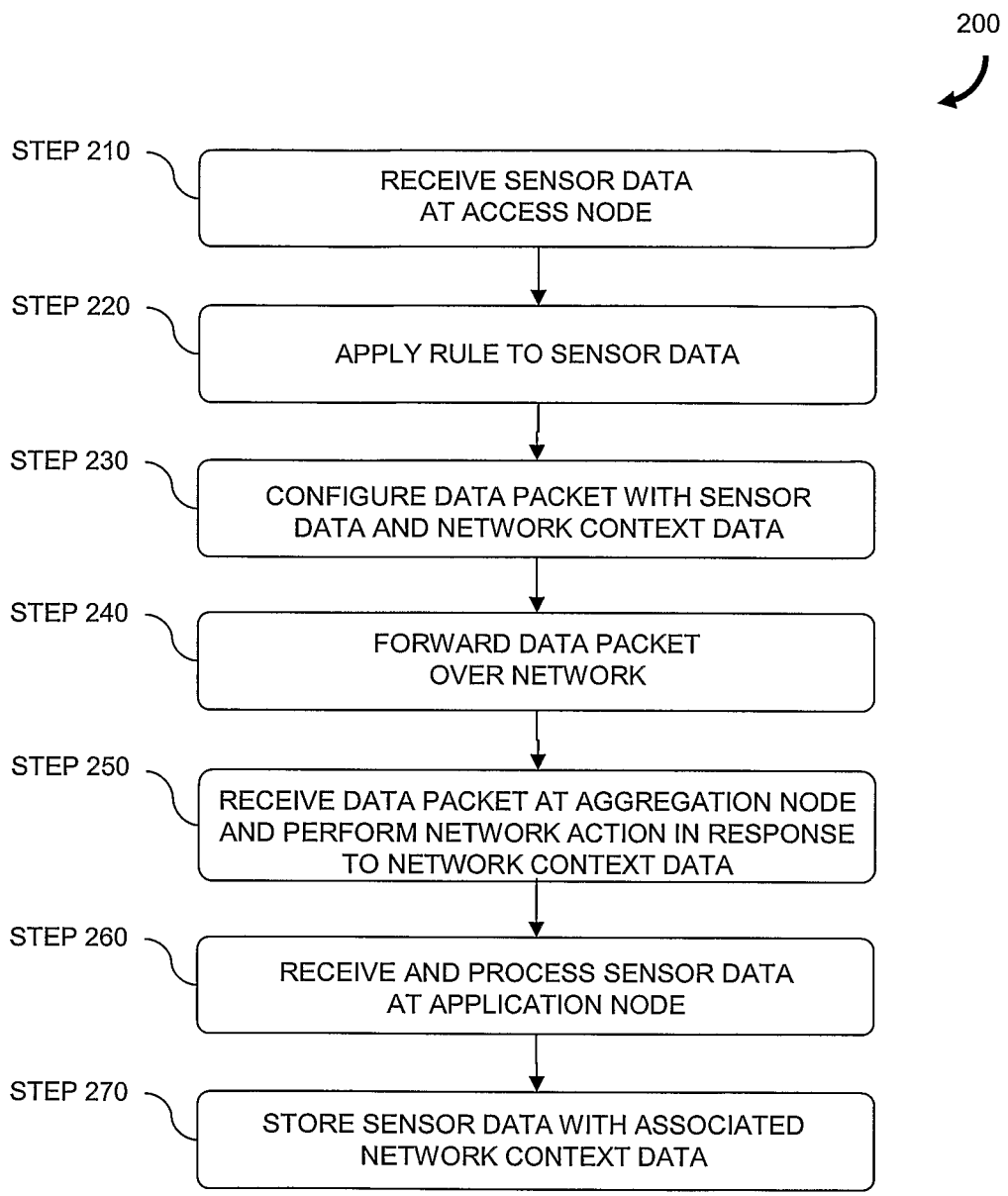
FIG. 4 is a flowchart representation of an embodiment of a method for in-network processing of sensor data in a sensor aware network according to the invention.

FIG. 4 is a flowchart representation of an embodiment of a method 200 for in-network processing of sensor data in a sensor aware network according to the invention. The following example of in-network processing of sensor data using network context data refers to FIG. 1 and FIG. 4. Data from pressure sensors and temperature sensors are received (step 210) at an access node 18. An application-based rule generated at an application node 26 and distributed from the network control module 28 to the access node 18 requires that all data from a pressure sensor be tagged as high priority if temperature data from a "paired" temperature sensor exceeds a threshold temperature value. The rule is applied (step 220) to a sensor data packet received from a sensor 14 (or local sensor network 16) and it is determined that the temperature at the sensor pair exceeds the threshold temperature. As a result, an IP data packet is configured (step 230) at the access node 18 which includes a payload having the data from the pressure sensor and network context data in the form of a priority tag. In addition, the IP header of the data packet is generated with a priority service rate. The data packet is forwarded (step 240) over the sensor aware network towards the application node 26.

The data packet is received by an aggregation node 22 which "snoops" the data packet to read and interpret the network context data inside the data payload. The aggregation node 22 sees the network context data and responds by performing (step 250) a network action. Examples of network actions include modifying the routing information, copying and forwarding the data packet to another application node, multicasting the data packet, making multiple copies for multiple applications, and sending the data packet to remote personnel using a VOIP/Multimedia session. The data packet can be received at other sensor aware nodes in the sensor aware network before being received and processed (step 260) by the application node 26. In one embodiment, the sensor data are stored (step 270) with the associated network context data in a database. A later search can be performed to retrieve specific data from the database. For example, a search can be requested for a pressure data stored with a priority tag during a certain time interval.

While the invention has been shown and described with reference to specific embodiments, it should be understood by those skilled in the art that various changes in form and detail may be made therein without departing from the spirit and scope of the invention.

What is claimed is:

1. A sensor aware network comprising:
    a first sensor aware node configured to receive sensor data and to generate a data packet for transmission over the sensor aware network, the data packet having a packet header and a payload comprising network context data and the sensor data, the network context data being determined in response to at least one rule provided by an application, wherein said rule requires access approval, wherein said network context data comprises at least one tag added to said payload by said first sensor aware node in accordance with said rule; and
    a second sensor aware node configured to receive the generated data packet, wherein said second sensor aware node examines said payload to determine if network context data is present, and when network context data is present then performing a network action in response to the network context data, wherein said action comprises said sensor aware node changing routing information for said data packet, wherein said changing routing information for said data packet comprises modifying header information for said data packet to a desired destination according to the applicable rule and forwarding said data packet to a network node determined according to the network context data, and when network context data is not present then routing said generated data packet according to information in said header.

2. The sensor aware network of claim 1 wherein said rule requires that all network context data inserted into data packets include a node timestamp and an IP address.

3. A sensor aware network comprising:
    a sensor adapted to generate sensor data in response to a sensor measurement;
    a first sensor aware node configured to receive sensor data and to generate a data packet for transmission over the sensor aware network, the data packet having a packet header and a payload comprising network context data and the sensor data, the network context data being determined in response to at least one rule provided by an application, wherein said rule requires access approval, wherein said network context data comprises at least one tag added to said payload by said first sensor aware node in accordance with said rule; and
    a second sensor aware node configured to receive the generated data packet, wherein said second sensor aware node examines said payload to determine if network context data is present, and when network context data is present then performing a network action in response to the network context data, wherein said action comprises said second sensor aware node changing routing information for said data packet, wherein said changing routing information for said data packet comprises modifying header information for said data packet to a desired destination according to the applicable rule and forwarding said data packet to a network node determined according to the network context data, and when network context data is not present then routing said generated data packet according to information in said header.

4. The sensor aware network of claim 3 further comprising a network command module to provide a policy to the first sensor network aware node, the policy having at least one rule used to determine the network context data.

5. The sensor aware network of claim 3 wherein the first sensor aware node is an access node.

6. The sensor aware network of claim 3 wherein the first sensor aware node is an aggregation node.

7. The sensor aware network of claim 3 wherein the network context data comprise sensor flow control information.

8. The sensor aware network of claim 3 wherein said rule requires that all network context data inserted into data packets include a node timestamp and an IP address.

9. A method of dynamic sensor network processing of a data packet, the method comprising:
  receiving sensor data at a first sensor aware node; and
  generating, at the first sensor network aware node, a data packet having a packet header and a data payload comprising network context data and the sensor data, the network context data being determined according to at least one rule, wherein said rule requires access approval, wherein said network context data comprises at least one tag added to said payload by said first sensor aware node in accordance with said rule;
  receiving the data packet at a second sensor aware node; and
  wherein said second sensor aware node examines said payload to determine if network context data is present, and if network context data is present then performing a network action in response to the network context data, wherein said network action comprises said second sensor aware node changing routing information for said data packet, wherein said changing routing information for said data packet comprises modifying header information for said data packet to a desired destination according to the applicable rule and forwarding said data packet accordingly to a network node determined according to the network context data, and when network context data is not present then routing said generated data packet according to information in said header.

10. The method of claim 9 wherein the sensor aware node is an access node.

11. The method of claim 9 wherein the sensor aware node is an aggregation node.

12. The method of claim 9 further comprising receiving the data packet at an application node.

13. The method of claim 12 further comprising performing an application action in response to the network context data received at the application node.

14. The method of claim 9 wherein the network context data is absent from the data payload in response to an application of the rule to the received sensor data.

15. The method of claim 9 further comprising performing a network action at a third sensor aware node in response to the receipt of the sensor data at the second sensor aware node.

16. The method of claim 15 wherein performing a network action at a third sensor aware node comprises modifying network context data in a data payload of a data packet received at the third sensor aware node.

17. The method of claim 9 wherein said rule requires that all network context data inserted into data packets include a node timestamp and an IP address.

* * * * *